J. N. BASHAW.
Draft-Equalizers.

No. 149,707.                      Patented April 14, 1874.

UNITED STATES PATENT OFFICE.

JOHN N. BASHAW, OF GENEVA LAKE, WISCONSIN.

IMPROVEMENT IN DRAFT-EQUALIZERS.

Specification forming part of Letters Patent No. 149,707, dated April 14, 1874; application filed January 28, 1874.

*To all whom it may concern:*

Be it known that I, JOHN N. BASHAW, of Geneva Lake, in the county of Walworth and State of Wisconsin, have invented an Improved Draft-Equalizer and Tongue-End for Vehicles, of which the following is a specification:

This invention has for its object to dispense with the ordinary pin or bolt which pivots the double-tree to the pole of a vehicle, and replace it with a coupling and bearing so arranged that as the stronger animal of the team pulls forward his end of the double-tree, the leverage of that end will be decreased, while that on the end to which is the weaker animal will be increased, and thus equalize the labor of the team; also, to provide the tongue-end with a latch, for the pole-ring of the neck-yoke cannot slip off if the whiffletrees should become accidentally detached.

Figure 1:
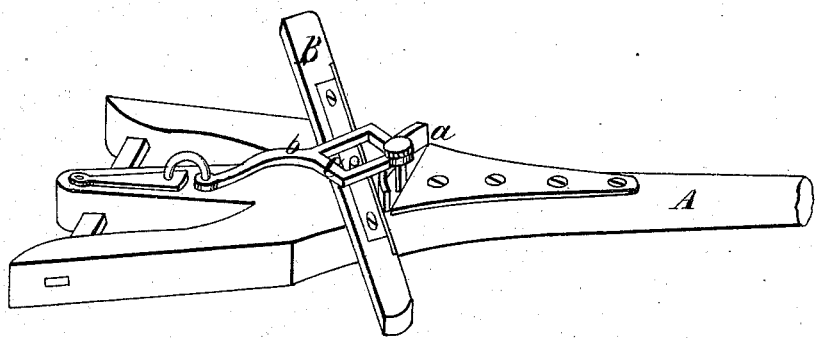
Figure 2:
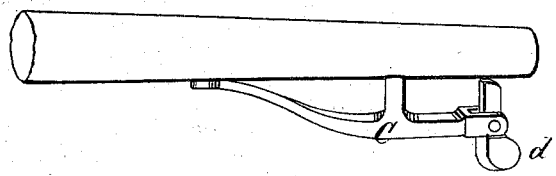

Figure 1 is a perspective view of the rear end of a wagon-tongue with my improved equalizer attached. Fig. 2 is a side elevation of the pole end and latch.

In the drawing, A represents the tongue, and B the double-tree, which is not pivoted thereto, as heretofore, but in place of which a metal segment, $a$, is secured to the top of the tongue, with its convexity to the rear, forming a bearing for the front edge of the double-tree to work against. The double-tree is kept from moving laterally by a strap, $b$, passing over its top, with a diamond-shaped opening, into which a pin, $c$, projects from the top of the double-tree, the ends of said strap being secured to the tongue by suitable bolts.

It is evident that as one end is pulled around or forward by the stronger animal, that arm of the double-tree is shortened in its leverage against the bearing $a$, while the other is correspondingly lengthened.

C is the usual tongue-end under the front end of the pole, over which the neck-yoke ring is slipped. In the front end of this tongue-end is pivoted a latch, $d$, weighted at one end to hang vertically, with a shoulder on the pendent end, which allows the upper end to be pushed back to introduce the ring, but will not allow it to move forward and detach the team from the pole in case the whiffletrees should break or be unhooked.

What I claim as my invention, and desire to secure by Letters Patent, is—

1. The segment-bearing $a$ on the tongue A, the slotted strap $b$, and the pin $c$ on the double-tree B, constructed and combined to operate substantially as described.

2. The latch $d$ in the tongue-end C, combined as and for the purpose set forth.

JOHN N. BASHAW.

Witnesses:
C. L. OATMAN,
JAS. SIMMONS.